(12) United States Patent
Kamatani (10) Patent No.: US 7,119,973 B2
(45) Date of Patent: Oct. 10, 2006

(54) MAGNETIC TRANSFER APPARATUS

(75) Inventor: Akito Kamatani, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/715,443

(22) Filed: Nov. 19, 2003

(65) Prior Publication Data
US 2004/0105183 A1   Jun. 3, 2004

(30) Foreign Application Priority Data
Nov. 20, 2002   (JP) .............................. 2002-336536

(51) Int. Cl.
*G11B 5/86* (2006.01)
(52) U.S. Cl. .......................................... 360/17; 360/16
(58) Field of Classification Search ............ 360/15–17; 369/84
See application file for complete search history.

(56) References Cited

U.S. PATENT DOCUMENTS

2001/0055167 A1*  12/2001  Matsuda et al. .............. 360/16
2002/0030909 A1    3/2002  Aoki et al.

* cited by examiner

*Primary Examiner*—Andrea Wellington
*Assistant Examiner*—Varsha A. Kapadia
(74) *Attorney, Agent, or Firm*—Sughrue Mion, PLLC (57) ABSTRACT

A magnetic transfer apparatus magnetically transfers information carried by a master information carrier to a slave medium held in close contact with the master information carrier by a holder disposed on the holder support portion of a magnetic transfer apparatus. The holder is formed by a pair of halves movable toward and away from each other, and a transfer magnetic field is applied to the master information carrier and the slave medium held in close contact with each other by the holder. A locator mechanism is provided between the holder support portion and the holder and locates the holder at least in a direction perpendicular to the central axis of the holder.

10 Claims, 6 Drawing Sheets

MAGNETIC TRANSFER APPARATUS

BACKGROUND OF THE INVENTION

1. Field of the Invention

This invention relates to a magnetic transfer apparatus in which information carried by a master information carrier is magnetically transferred to a slave medium by setting the master information carrier and the slave medium in a transfer holder to bring them into close contact with each other and setting the transfer holder in a holder supporting portion of the magnetic transfer apparatus.

2. Description of the Related Art

This invention is applied to a magnetic transfer in which a master information carrier having an irregularity pattern or an embedded pattern representing information to be transferred and covered with a magnetic layer (a patterned master) is held in close contact with a slave medium having a magnetic recording area and a transfer magnetic field is applied to the master information carrier and the slave medium in this state, thereby recording a magnetization pattern corresponding to the information carried by the master information carrier on the slave medium.

When the slave medium is a disk medium such as a hard disk or a high-density flexible disk, the master information carrier is held in close contact with one or each side of the slave medium and the transfer magnetic field is applied to the slave medium and the master information carrier(s) in this state by a magnetic field application means comprising an electromagnet or a permanent magnet disposed on one or each side of the slave medium/master information carrier assembly.

In order to transfer the information in a good quality, it is important to hold the slave medium and the master information carrier in uniform close contact with each other. That is, when there is defect in close contact between the slave medium and the master information carrier, there is generated an area where no magnetic transfer occurs, which results in a signal missing in the information transferred to the slave medium and deterioration in quality of the signal transferred. When the transferred information is a servo signal, the signal missing results in an unsatisfactory tracking and deteriorates the reliability of the slave medium.

In the magnetic transfer, placing the slave medium and the master information carrier in a holder comprising a pair of holder halves which can be moved toward each other to hold the slave medium and the master information carrier in close contact with each other is advantageous in holding the slave medium and the master information carrier in close contact with each other uniformly over the entire area. See, for instance, U.S. Patent Laid-Open No. 20020030909.

A problem in the magnetic transfer is to accurately transfer the magnetization patter about the axis of rotation of the slave medium. Especially, in the case where the slave medium is a hard disk, the center of the magnetization pattern which is recorded on the slave medium by the magnetic transfer should accurately coincide with the center of rotation of the slave medium when it is rotated by a spindle motor of a disk driver. When the former center largely deviates from the latter center, the tracking function cannot be obtained. The tolerance of the primary eccentricity of the servo signal with the spindle motor kept rotated is generally about 50 to 100 μm.

The eccentricity is the sum of the errors including the eccentricity of the spindle from the center of the inner diameter of the slave medium and the eccentricity of the master information carrier and the slave medium from the axis of a holder which holds them during the magnetic transfer, and accordingly, it has been required that the eccentricity in the holder is minimized without deterioration of the processing efficiency of the magnetic transfer.

Conventionally since the holder has been fixed to the magnetic transfer apparatus body by bolts, mounting and demounting the holder on and from the magnetic transfer apparatus body is not good in workability, and adhesion to the master information carrier of dirt and/or dust generated from the operator or the parts during mounting and demounting of the holder can cause defective close contact between the slave medium and the master information carrier to deteriorate the quality of transfer.

Further since a locator mechanism for locating the holder with respect to the magnetic transfer apparatus body is not provided, the holder mounting accuracy cannot be reproduced upon change of the holders, it has been necessary to provide a fine movement X-Y stage in the holder mounting portion of the magnetic transfer apparatus body and to carry out a fine adjustment of the position of the holder each time the holders are changed.

The master information carrier held by the holder is sometimes cleaned every predetermined times of magnetic transfer to remove dust and/or dirt adhering to the surface thereof. When the master information carrier is taken out from the holder, the master information carrier must be located again in the holder after the cleaning, which is very troublesome. Accordingly, the holder is generally removed from the magnetic transfer apparatus body with the master information carrier held therein when the master information carrier is to be cleaned. Thus it is preferred that the holder be readily located with respect to the magnetic transfer apparatus body.

SUMMARY OF THE INVENTION

In view of the foregoing observation and description, the primary object of the present invention is to provide a magnetic transfer apparatus which can reproduce the holder mounting accuracy, thereby simply ensuring a high processing efficiency and a high positional accuracy of the magnetic transfer.

In accordance with the present invention, there is provided a magnetic transfer apparatus in which a master information carrier carrying thereon information to be transferred to a slave medium is held in close contact with the slave medium by a holder disposed on the holder support portion of a magnetic transfer apparatus and comprising a pair of halves movable toward and away from each other, and a transfer magnetic field is applied to the master information carrier and the slave medium held in close contact with each other by the holder, wherein the improvement comprises a locator mechanism which is provided between the holder support portion and the holder and locates the holder at least in a direction perpendicular to the central axis of the holder.

Preferably, the locator mechanism is provided with at least one of a sliding guide and a rolling guide employed at a contact portion between the holder and the holder support portion.

It is preferred that the magnetic transfer apparatus further comprises a pressing mechanism which presses the holder against the holder support portion. The pressing mechanism suitably comprises a spring, a cylinder, a screw, a ball screw or a toggle clamp.

It is preferred that the pressing mechanism presses the holder in a direction at an angle to the axis of rotation of the holder and the locator mechanism locates the holder in at least two directions.

The locator mechanism for locating the holder at least in a direction perpendicular to the central axis of the holder may comprise a mechanism for locating and fixing the holder in the direction of the central axis thereof separately from the mechanism for locating and fixing the holder in the direction perpendicular to the central axis thereof.

In the magnetic transfer apparatus in accordance with the present invention, by virtue of the locator mechanism which locates the holder at least in a direction perpendicular to the central axis of the holder, the holder can be accurately and easily relocated on the holder support portion after it is once removed therefrom, whereby workability in maintenance such as changing the holders or cleaning the master information carrier can be improved and a stabilized magnetic transfer accuracy can be ensured.

When the locator mechanism comprises a sliding guide or a rolling guide employed at the contact portion between the holder and the holder support portion, the holder locating accuracy is improved and the locator mechanism can be high in rigidity and excellent in durability, which is advantageous also from the viewpoint of cost.

When the magnetic transfer apparatus further comprises a pressing mechanism which presses the holder against the holder support portion in a direction at an angle to the axis of rotation of the holder, the holder can be surely located with respect to the holder support portion and at the same time, a locator mechanism which locates the holder simultaneously in two directions can be easily formed.

Though preferably comprising at least one of a sliding guide and a rolling guide, the locator mechanism may comprise a gas lubrication guide or a magnetic support guide. The gas lubrication guide includes a static pressure type, a dynamic pressure type, a squeeze film type, and the like. These guides are not preferred in view of a low rigidity and a high cost though they are advantageous in the locating accuracy.

DESCRIPTION OF THE PREFERRED EMBODIMENTS

Figure 1:
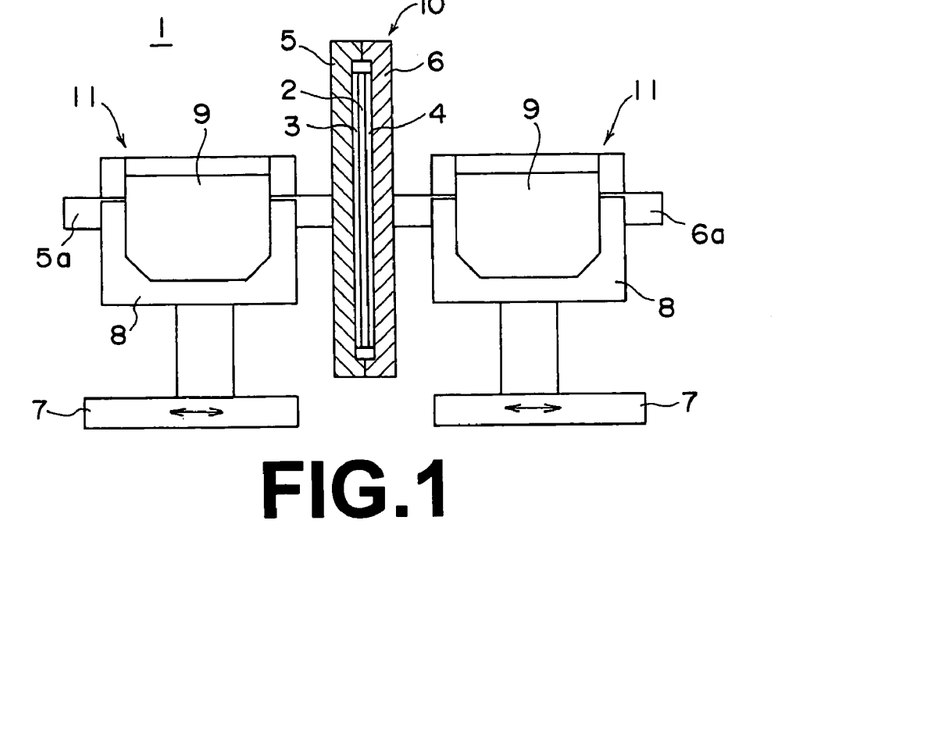
FIG. 1 is a schematic view showing a magnetic transfer apparatus in accordance with an embodiment of the present invention.

In FIG. 1, a magnetic transfer apparatus 1 comprises a transfer holder 10 formed by a pair of holder halves, a first holder half 5 and a second holder half 6. The first and second holder halves 5 and 6 are closed to form an air-tight space therebetween, in which a pair of master information carriers, a first master information carrier 3 and a second master information carrier 4 carrying thereon information (e.g., a servo signal) to be transferred to a slave medium 2 and the slave medium 2 are placed so that the master information carriers 3 and 4 are brought into close contact with opposite sides of the slave medium 2.

Though not shown in detail, the first holder half 5 holds the first master information carrier 3 and the slave medium 2 on its inner surface under a suction and the second holder half 6 holds the second master information carrier 4 on its inner surface under a suction.

A first support shaft 5a is erected from the outer side of the first holder half 5 at its center and a second support shaft 6a is erected from the outer side of the second holder half 6 at its center. The first and second support shafts 5a and 6a are supported by left and right holder support portions 8 of the magnetic transfer apparatus body 7. A locator mechanism 11 is provided between each of the first and second holder halves 5 and 6 and each of the left and right holder support portions 8 to locate the holder half at least in a direction perpendicular to the central axis of the holder. The locator mechanism 11 comprises a structure provided at a contact portion between the holder and the holder support portion to guide the holder half in sliding motion.

That is, a locator block 9 is mounted on each of the first and second support shafts 5a and 6a. Each holder support portion 8 is erected from the magnetic transfer apparatus body 7 and is provided with a recess 8a in which the locator block 9 is fitted, whereby the locator half is located at least in X- and Y-directions (FIG. 2) perpendicular to the axes of the first and second holder halves 5 and 6. Thus the center of the support shaft 5a and 6a are located.

The first and second holder halves 5 and 6 are associated with a rotator mechanism (not shown) to be integrally rotated about the first and second support shafts 5a and 6a, which are supported for rotation respectively on the left and right holder support portions 8.

Figure 2:
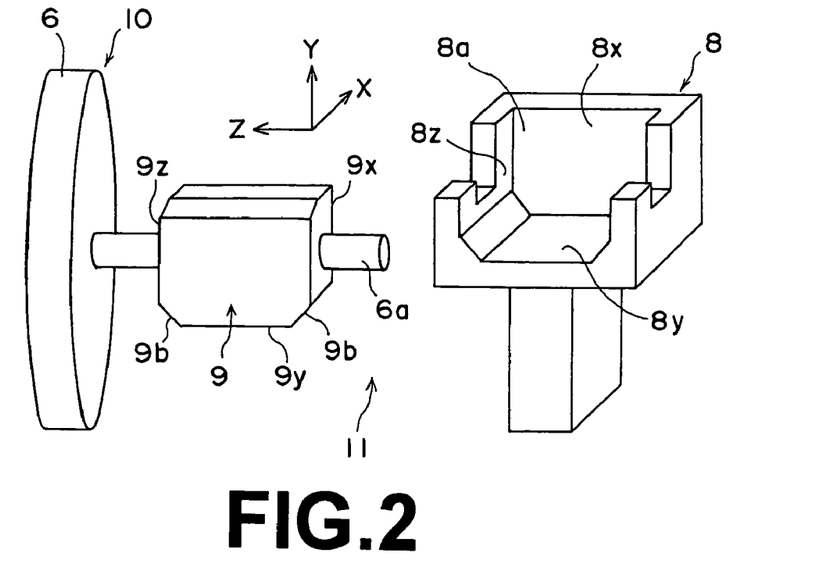
FIG. 2 is an exploded perspective view showing the locator mechanism of the embodiment.

Each locator block 9 of the locator mechanism 11, as shown in FIG. 2 (In FIG. 2, only the second holder half 6 is shown), has an X-direction side surface 9x which is brought into abutment against an X-direction side surface 8x of the recess 8a of the holder support portion 8 when the locator block 9 is fitted in the recess 8a and locates the holder 10 in the X-direction perpendicular to the central axis of the holder 10 and a Y-direction bottom surface 9y which is brought into abutment against an Y-direction bottom surface 8y of the recess 8a of the holder support portion 8 when the locator block 9 is fitted in the recess 8a and locates the holder half in the Y-direction perpendicular to the central axis of the holder 10.

In the direction of the central axis of the holder 10 (Z-direction), the holder half is located by abutment between an end face 9z of the locator block 9 and an end face 8z of the recess 8a. The first and second holder halves 5 and 6 are opened and closed, slide away from and toward each other, in the Z-direction, and the magnetic transfer apparatus 1 has a locking means which holds the first and second holder halves 5 and 6 in their closed positions under a pressure. The locator block 9 has tapered lower corners 9b which guide the locator block 9 when the locator block 9 is inserted into the recess 8a of the holder support portion 8 from above.

FIGS. 3A to 3D respectively shows modifications of the locator mechanism which guides the holder in sliding motion. In the modifications shown in FIGS. 3A to 3D, the locator blocks 91 to 94 are rested on the upper surfaces of the holder support portions 81 to 84 to locate the holder half in X- and Y-directions. In the Z-direction, the locator blocks 91 to 94 are slidable on the upper surfaces of the holder support portions 81 to 84. However, the holder 10 is located in the Z-direction by the opening and closing mechanism (not shown) which acts on the support shaft 6a.

Figure 3A:
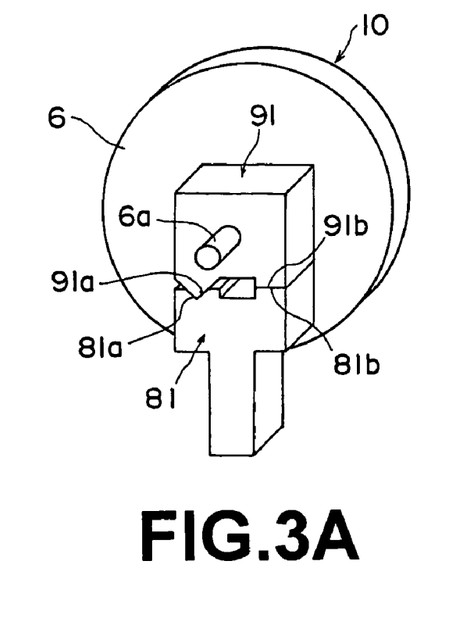
FIGS. 3A to 3D are views respectively showing an important portion of modifications of the locator mechanism.

In the modification shown in FIG. 3A, the locator block 91 is provided on its bottom surface with a V-shaped projection 91a extending in the direction of the central axis of the holder 10 and a flat surface 91b, whereas the holder support portion 81 is provided on its upper surface with a V-shaped groove 81a which extends in the direction of the central axis of the holder 10 and is engaged with the projection 91a of the locator block 91 to locate the holder 10 in the X-direction and a flat surface 81b against which the flat surface 91b of the locator block 91 abuts to locate the holder 10 in the Y-direction.

Figure 3B:
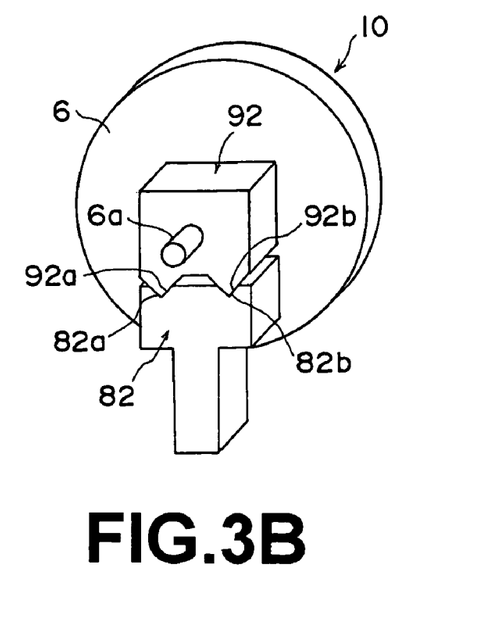

In the modification shown in FIG. 3B, the locator block 92 is provided on its bottom surface with a pair of parallel V-shaped projections 92a and 92b extending in the direction of the central axis of the holder 10, whereas the holder support portion 82 is provided on its upper surface with a pair of parallel V-shaped grooves 81a and 82b which extend in the direction of the central axis of the holder 10 and are respectively engaged with the projections 92a and 92b of the locator block 92 to locate the holder 10 in the X- and Y-directions.

Figure 3C:
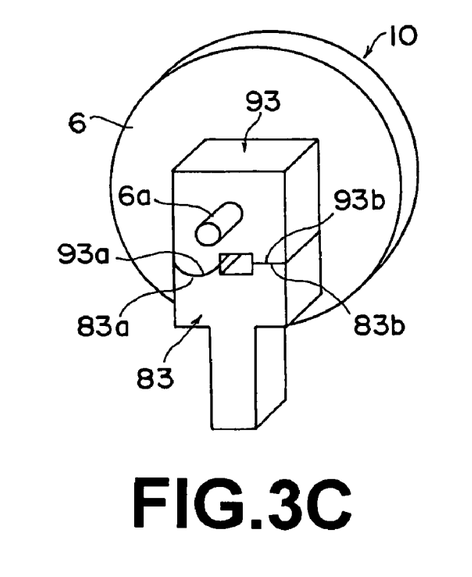

In the modification shown in FIG. 3C, the locator block 93 is provided on its bottom surface with a U-shaped (or semicircular) projection 93a extending in the direction of the central axis of the holder 10 and a flat surface 93b, whereas the holder support portion 83 is provided on its upper surface with a U-shaped (or semicircular) groove 81a which extends in the direction of the central axis of the holder 10 and is engaged with the projection 93a of the locator block 93 to locate the holder 10 in the X-direction and a flat surface 83b against which the flat surface 93b of the locator block 93 abuts to locate the holder 10 in the Y-direction.

Figure 3D:
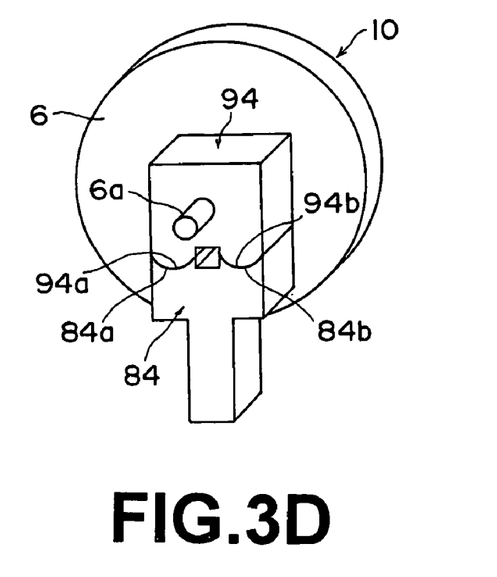

In the modification shown in FIG. 3D, the locator block 94 is provided on its bottom surface with a pair of parallel U-shaped (or semicircular) projections 94a and 94b extending in the direction of the central axis of the holder 10, whereas the holder support portion 84 is provided on its upper surface with a pair of parallel U-shaped (or semicircular) grooves 84a and 84b which extend in the direction of the central axis of the holder 10 and are respectively engaged with the projections 94a and 94b of the locator block 94 to locate the holder 10 in the X- and Y-directions.

In the modification shown in FIG. 7 to be described later, the locator block 95 is provided on its bottom surface with a projection 95a having a front and rear inclined surfaces and extending in the direction of the central axis of the holder 10, whereas the holder support portion 85 is provided on its upper surface with a groove 85a having a front and rear inclined surfaces and extending in the direction of the central axis of the holder 10. The holder 10 is located in the X- and Y-directions by abutment of the front and rear inclined surfaces of the groove 85a against the front and rear inclined surfaces of the projection 95a.

Figure 4:
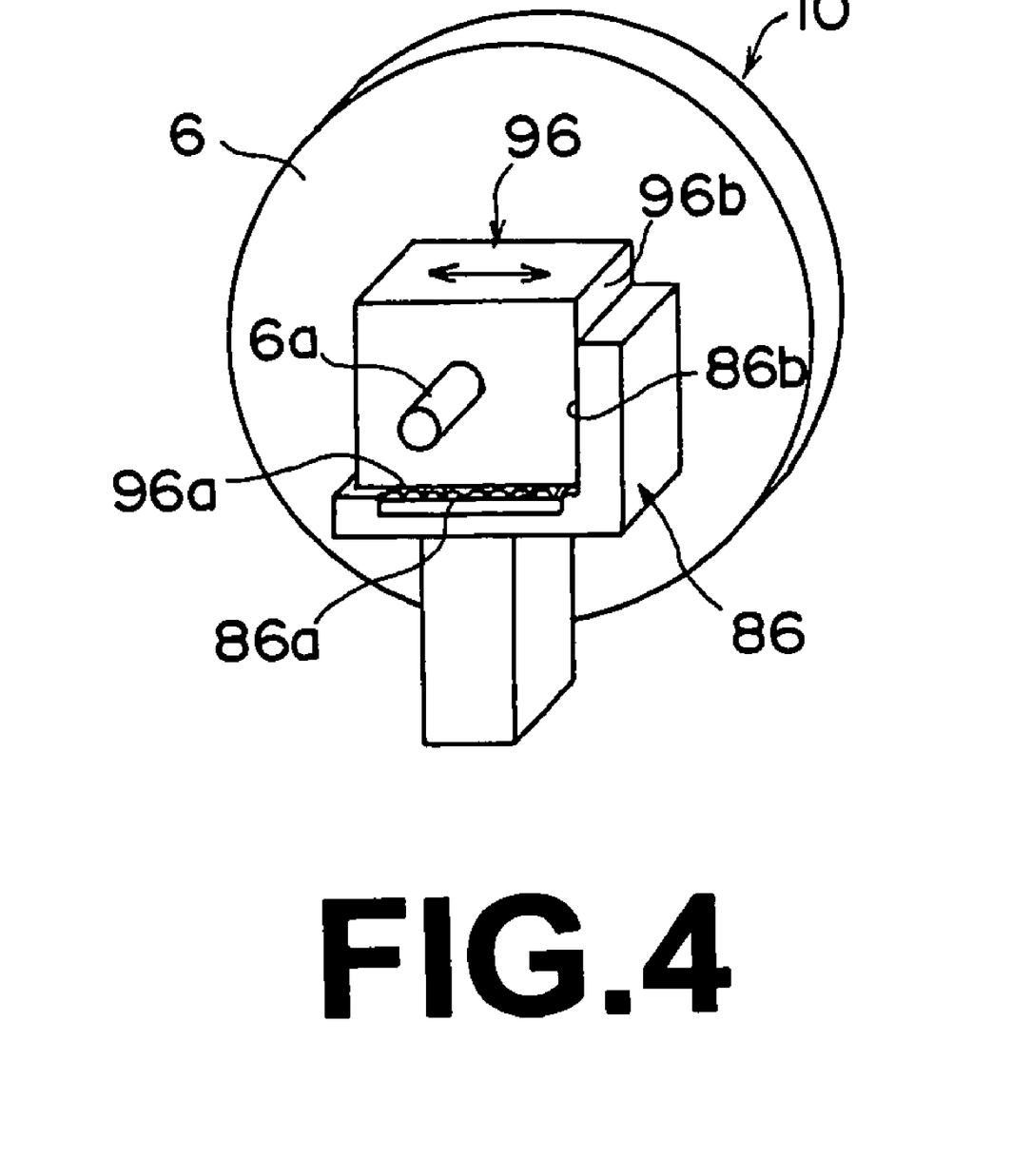
FIG. 4 is a view showing an important portion of a still another modification of the locator mechanism.

FIG. 4 shows a still another modification of the locator mechanism, where a rolling guide is employed in place of the sliding guide. In this case, the locator block 96 is rested on the holder support portion 86 to locate the holder 10 in the X- and Y-directions and is slidable in the X-direction under a rolling guide. The holder 10 is located in the Z-direction by the opening and closing mechanism (not shown) which acts on the support shaft 6a.

That is, in the modification shown in FIG. 4, the locator block 96 is provided with a flat bottom surface 96a and a flat side surface 96b, whereas the holder support portion 86 is provided on its upper surface with rollers 86a which guide the locator block 96 rested thereon in the X-direction in a rolling motion, and a flat side surface 86b. The holder 10 is located in the X-direction by abutment of the flat side surface 96b of the locator block 96 against the flat side surface 86b of the holder support portion 86 and in the Y-direction by abutment of the flat bottom surface 96a of the locator block 96 against the rollers 86a of the holder support portion 86.

Figure 5A:
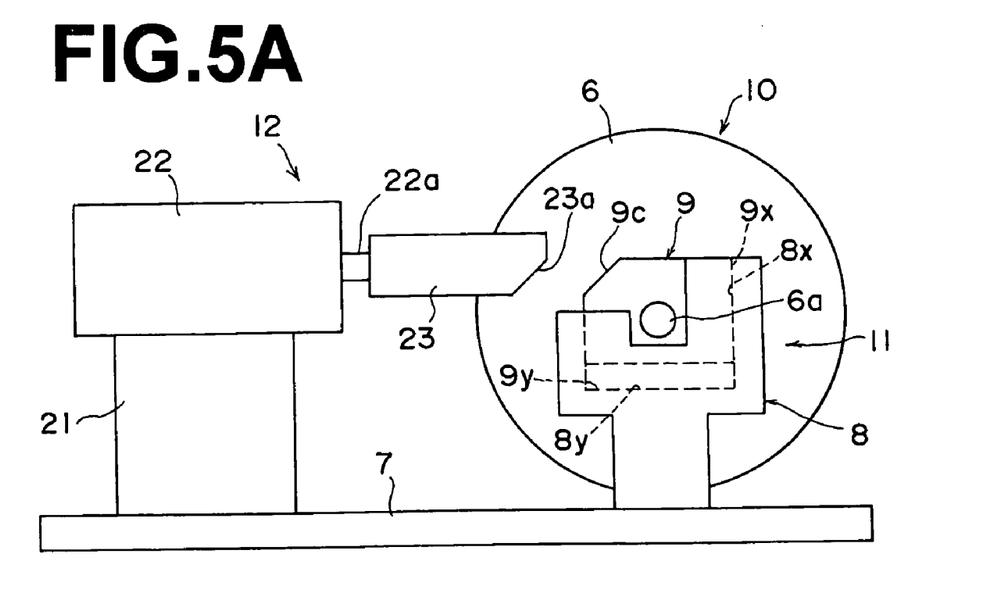
FIGS. 5A and 5B are views showing still another modification of the locator mechanism.
Figure 5B:
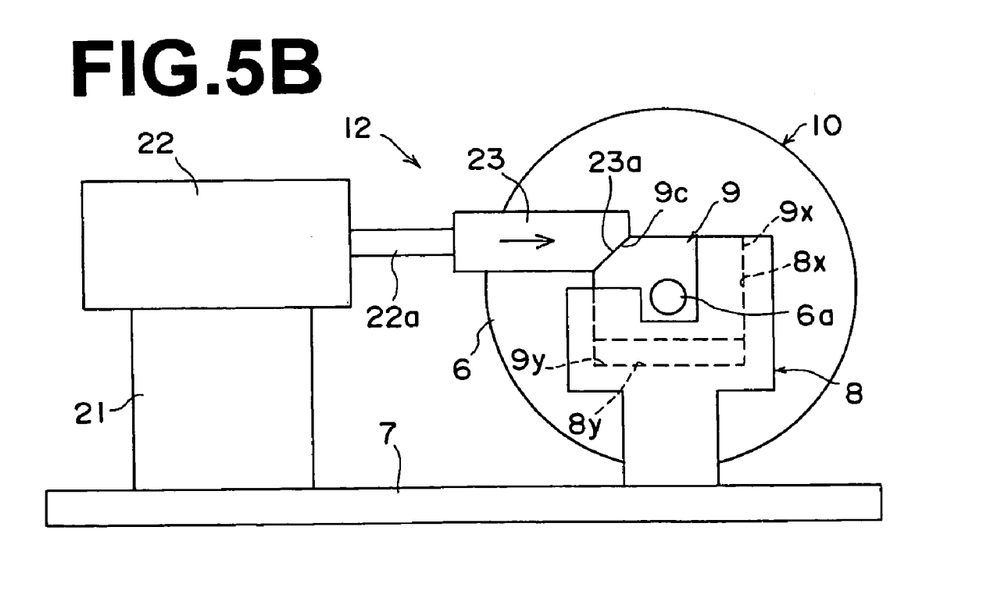

FIGS. 5 (5A and 5B), 6 (6A and 6B) and 7 respectively show still other modifications of the locator mechanism, where a pressing mechanism 12 which presses the locator block 9 against the holder support portion 8 to more surely locate the holder 10 is further provided. The pressing mechanism 12 suitably comprises a spring, a cylinder, a screw, a ball screw or a toggle clamp. The pressing mechanism 12 presses the locator block 9 in a direction at an angle to the axis of rotation of the holder 10 and the locator mechanism locates the holder in at least two directions.

In the modification shown in FIGS. 5A and 5B, the locator mechanism 11 comprises a locator block 9 and a holder support portion 8 which are the same as those shown in FIG. 2, and a pressing mechanism 12 employing a cylinder 22 is provided. The pressing mechanism 12 comprises a cylinder 22 supported on the magnetic transfer apparatus body 7 by way of a support table 21. The cylinder 22 has a rod 22a which is projected and retracted in the X-direction and a pressing portion 23 is mounted on the tip of the rod 22a. The pressing portion 23 is provided on its tip with an inclined surface 23a, whereas the locator block 9 is provided on its upper corner with an inclined surface 9c so that the inclined surface 23a of the pressing portion 23 abuts against the inclined surface 9c of the locator block 9 when the rod 22a is projected as shown in FIG. 5B to press, respectively, the X-direction side surface 9x and the Y-direction bottom surface 9y of the locator block 9 against the X-direction side surface 8x and the Y-direction bottom surface 8y of the holder support portion 8 under an X-direction component force and a Y-direction component force.

Figure 6A:
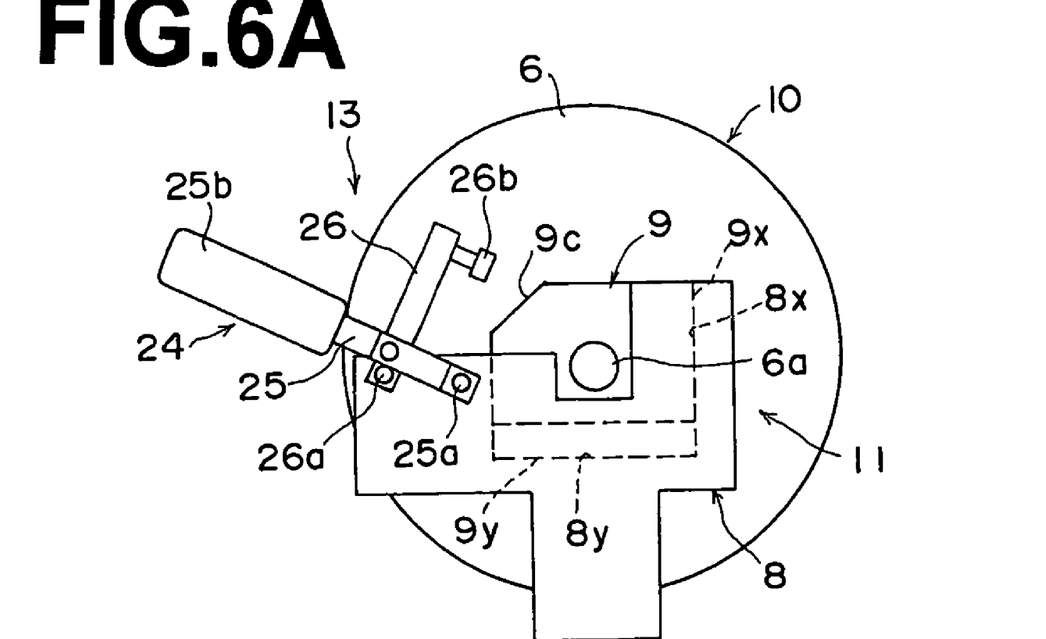
FIGS. 6A and 6B are views showing still another modification of the locator mechanism.
Figure 6B:
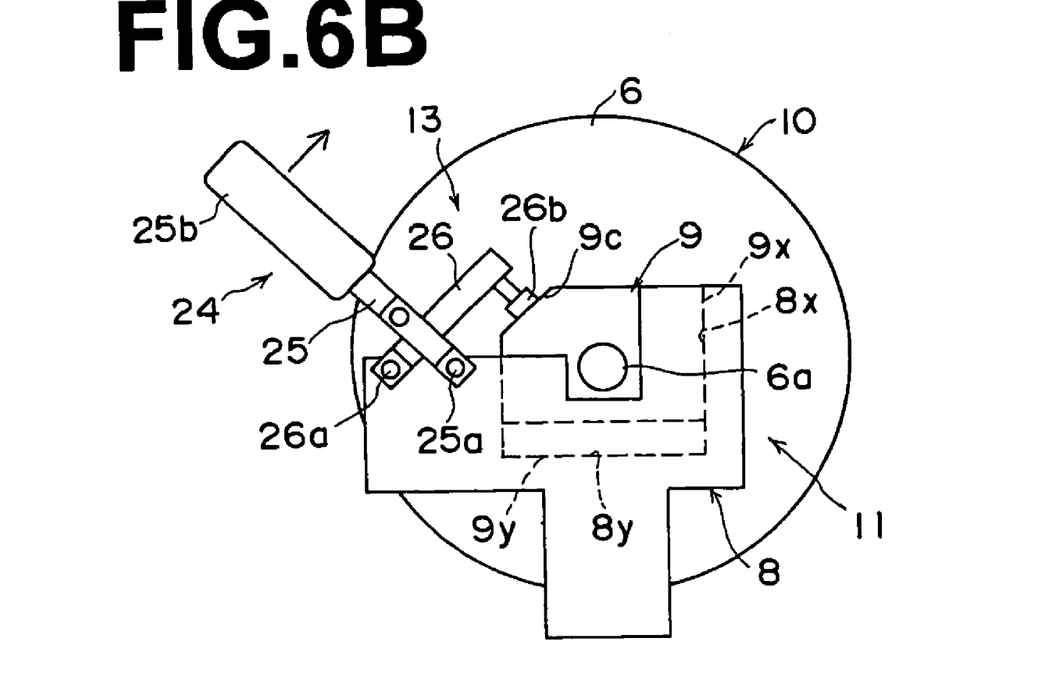

In the modification shown in FIGS. 6A and 6B, the locator mechanism 11 comprises a locator block 9 and a holder support portion 8 which are the same as those shown in FIG. 2, and a pressing mechanism 13 employing a toggle clamp 24 is provided. The pressing mechanism 13 comprises a toggle clamp 24 supported on the holder support portion 8 and having a control arm 25 and a clamp lever 26. The control arm 25 and the clamp lever 26 of the toggle clamp 24 are mounted for rotation on the holder support portion 8 at their base end portions 25a and 26a. A pressing portion 26b is provided on the tip of the clamp lever 26 and the locator block 9 is provided on its upper corner with an inclined surface 9c so that the pressing portion 26b abuts against the inclined surface 9c of the locator block 9 when the control arm 25 of the toggle clamp 24 is clockwise rotated as shown in FIG. 6B to press, respectively, the X-direction side surface 9x and the Y-direction bottom surface 9y of the locator block 9 against the X-direction side surface 8x and the Y-direction bottom surface 8y of the holder support portion 8 under an X-direction component force and a Y-direction component force.

Figure 7:
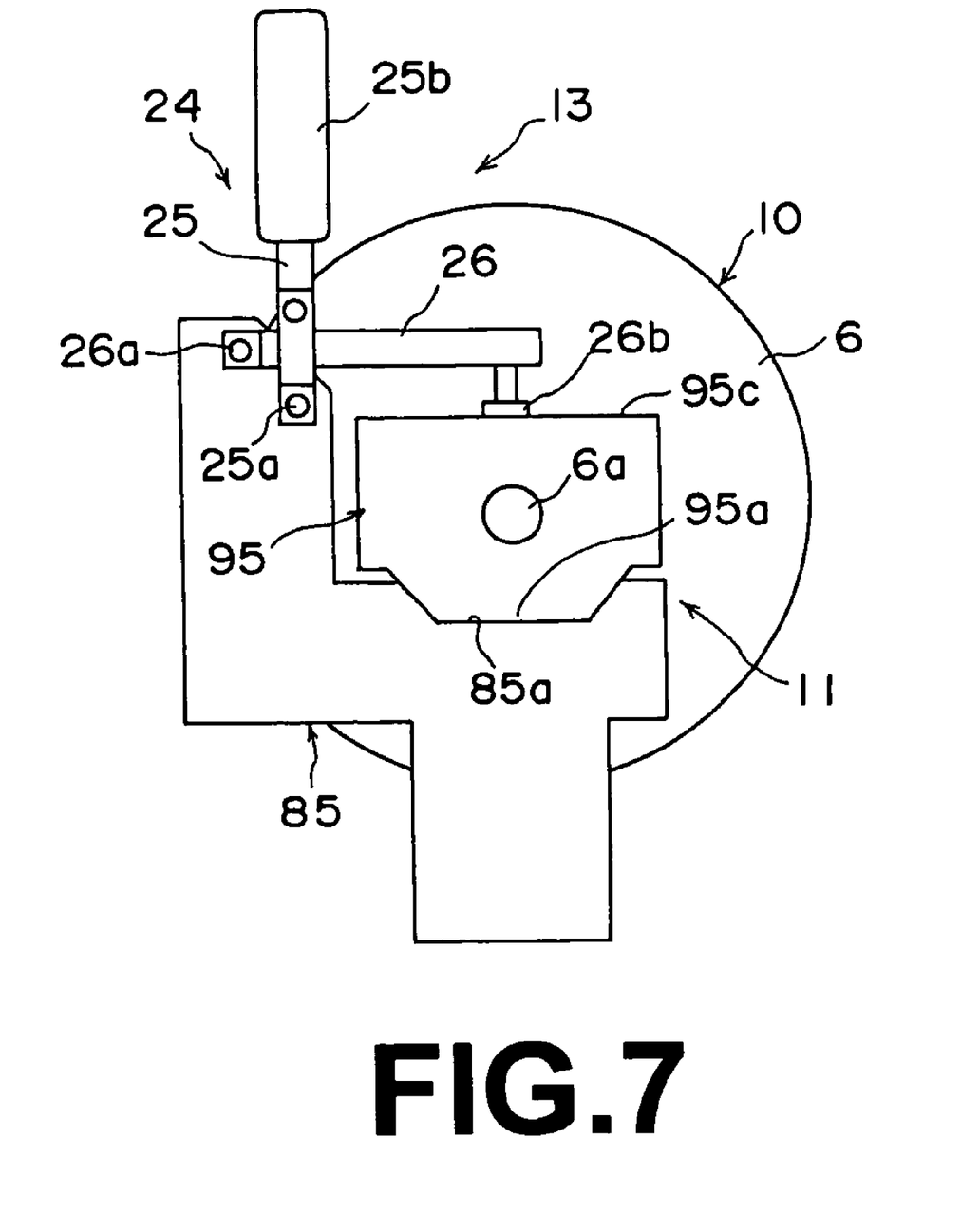
FIG. 7 is a view showing still another modification of the locator mechanism.

In the modification shown in FIG. 7, a pressing mechanism 13 employing a toggle clamp 24 which is different from that shown in FIG. 6 in pressing direction is provided. In this modification, the toggle clamp 24 comprises a control arm 24 and a clamp lever 26 which are the same as those shown in FIG. 6 and are mounted on an upper portion of an extension of the holder support portion 85. The control arm 25 and the clamp lever 26 of the toggle clamp 24 are mounted for rotation on the holder support portion 85 at their base end portions 25a and 26a. A pressing portion 26b is provided on the tip of the clamp lever 26 so that the pressing portion 26b abuts against the upper surface 95c of the locator block 95 when the control arm 25 of the toggle clamp 24 is clockwise rotated to locate the holder 10 in both the X- and Y-directions by way of the abutment between the front and rear inclined surfaces of the projection 95a of the locator block 95 and the groove 85a on the upper surface of the holder support portion 85.

The locator mechanisms 11 of the embodiments having the arrangements described above locate the first and second holders 5 and 6 in an accuracy of several to several tens μm. Since the tolerance of the primary eccentricity between the center of rotation of the slave medium 2 when the slave medium 2 is driven by the spindle motor of the driver and the center of the magnetization pattern magnetically transferred to the slave medium is generally about 50 to 100 μm and the primary eccentricity is the sum of the errors including the eccentricity of the spindle from the center of the inner diameter of the slave medium 2 and the eccentricity of the master information carrier 3 and the slave medium 2 from the axis of the holder which holds them during the magnetic transfer, the reproducibility of the holder mounting accuracy is required to be within several to several tens μm.

The master information carriers 3 and 4 may be located with respect to the holders 5 and 6 by various systems including a system where the former is located with respect to the latter by locating a locator mark provided on the former with respect to a locator mark provided on the latter by taking the images of the locator marks, for instance, by a CCD and processing the images, and a system where the former is located with respect to the latter by the use of locator members.

A magnetic recording disc such as a hard disc or a high-density flexible disc provided with a magnetic layer on one side or each side thereof is generally employed as the slave medium 2. The magnetic recording area thereof is generally of a coated magnetic layer or a metal film type magnetic layer. Before brought into close contact with a master information carrier or master information carriers for magnetic transfer, the slave medium 2 is initially magnetized in an in-plane direction or in a perpendicular direction.

The master information carrier comprises a substrate formed with a fine irregularity pattern on its surface and a magnetic layer formed over the irregularity pattern. The surface of the substrate carrying thereon the irregularity pattern and the magnetic layer forms the information carrying surface and the surface opposite to the information carrying surface is attracted by the holder under a vacuum. The substrate of the master information carrier may be formed, for instance, of, nickel, silicon, quartz, aluminum, alloys, ceramics, synthetic resin or the like. The irregularity pattern may be formed, for instance, by a stamper method. The magnetic layer may be formed by, for instance, vacuum film forming techniques such as vacuum deposition, sputtering or ion plating or a plating method. Substantially the same master information carrier can be used in both the in-plane recording and the perpendicular recording.

The magnetic field application means for applying the transfer magnetic field and the initial magnetic field, if necessary, comprises, for instance, a pair of ring type electromagnets each disposed on one side of the holder. Each of the electromagnets comprises a core having a gap extending in a radial direction of the slave medium 2 and a winding wound around the core. In the case of the in-plane recording, the ring type electromagnets on opposite sides of the holder 10 applies magnetic fields in the same direction in parallel to the tracks. The magnetic field application means applies a magnetic field to the slave medium 2 and the master information carrier while rotating the holder 10 to apply the magnetic field over the entire area of the slave medium 2 and the master information carrier. Instead of rotating the holder 10, the magnetic field application means may be rotated. The magnetic field application means may be disposed only on one side of holder 10 or on each side of the same. A permanent magnet may be employed in place of the electromagnets. In the case of the perpendicular recording, a pair of electromagnets or a permanent magnets different in polarity are disposed on opposite sides of the holder 10 so that a magnetic field is generated in perpendicular to the tracks. When the magnetic field application means is of a type which applies a magnetic field only a part of the slave medium 2 and the master information carrier, the holder 10 and the magnetic field are moved with respect to each other so that a magnetic field is applied to the slave medium 2 and the master information carrier over the entire area thereof.

Upon maintenance, for instance, cleaning the master information carrier, the holder is demounted from the holder support portion 8. When remounting the holder, the holder can be easily and accurately located with respect to the holder support portion in the magnetic transfer apparatus of this invention, whereby workability in changing the holders can be improved and a stabilized magnetic transfer accuracy can be ensured.

What is claimed is:

1. A magnetic transfer apparatus in which a master information carrier carrying thereon information to be transferred to a slave medium is held in close contact with the slave medium by a holder disposed on the holder support portion of a magnetic transfer apparatus and comprising a pair of halves movable toward and away from each other, and a transfer magnetic field is applied to the master information carrier and the slave medium held in close contact with each other by the holder, the magnetic transfer apparatus comprising a locator mechanism having a first surface,
wherein the first surface contacts a second surface of the holder support portion,
wherein the locator mechanism locates the holder at least in a direction perpendicular to the central axis of the holder; and
wherein the locator mechanism includes a first element provided in a part of the holder and a second element provided in a part of the holder support portion, wherein the second element removably receives the first element.

2. A magnetic transfer apparatus as defined in claim 1 in which the locator mechanism is provided with at least one of a sliding guide and a rolling guide employed at a contact portion between the holder and the holder support portion,
wherein the at least one of a sliding guide and a rolling guide is a guide for mounting the first element to the second element.

3. A magnetic transfer apparatus as defined in claim 1 further comprising a pressing mechanism which presses the holder against the holder support portion.

4. A magnetic transfer apparatus as defined in claim 3, in which the pressing mechanism presses the holder in a direction at an angle to the axis of rotation of the holder.

5. A magnetic transfer apparatus as defined in claim 1 further comprising pressing means for pressing the holder against the holder support portion.

6. A magnetic transfer apparatus as defined in claim 1, wherein the holder includes a support surface, which is opposed to a surface of one of the master information carrier and the slave medium, and a support shaft projecting, in parallel with the central axis of the holder, from the center of the back side of the support surface; wherein the first element is a locating block mounted onto the support shaft; wherein the second element is a receiving portion for receiving the locating block; wherein at least a part of the locating block is fitted into the receiving portion to locate the holder in the direction perpendicular to the central axis of the holder.

7. A magnetic transfer apparatus as defined in claim 6, wherein the locating block includes a first block surface perpendicular to the support surface and a second block surface perpendicular to the support surface and the first block surface, and wherein the receiving portion includes a first abutment surface, on which the first block surface abuts, and a second abutment surface, on which the second block surface abuts.

8. A magnetic transfer apparatus as defined in claim 6, wherein the locating block has a protrusion projecting therefrom in a direction along the support surface, and wherein the receiving portion has a depression into which the protrusion is fitted.

9. A magnetic transfer apparatus in which a master information carrier carrying thereon information to be transferred to a slave medium is held in close contact with the slave medium by a holder disposed on the holder support portion of a magnetic transfer apparatus and comprising a pair of halves movable toward and away from each other, and a transfer magnetic field is applied to the master information carrier and the slave medium held in close contact with each other by the holder, the magnetic transfer apparatus comprising a locator mechanism having a first surface, wherein the first surface contacts a second surface of the holder support portion, wherein the locator mechanism locates the holder at least in a direction perpendicular to the central axis of the holder, wherein the locator mechanism comprises a block portion including the first surface, and wherein the holder support portion includes a recess for receiving the block portion.

10. A magnetic transfer apparatus in which a master information carrier carrying thereon information to be transferred to a slave medium is held in close contact with the slave medium by a holder disposed on the holder support portion of a magnetic transfer apparatus and comprising a pair of halves movable toward and away from each other, and a transfer magnetic field is applied to the master information carrier and the slave medium held in close contact with each other by the holder, the magnetic transfer apparatus comprising a locator mechanism having a first surface, wherein the first surface contacts a second surface of the holder support portion, wherein the locator mechanism locates the holder at least in a direction perpendicular to the central axis of the holder, wherein the first surface includes an engaging portion, and wherein the second surface includes a receiving portion configured to receive the engaging portion.

* * * * *